Figure 1:
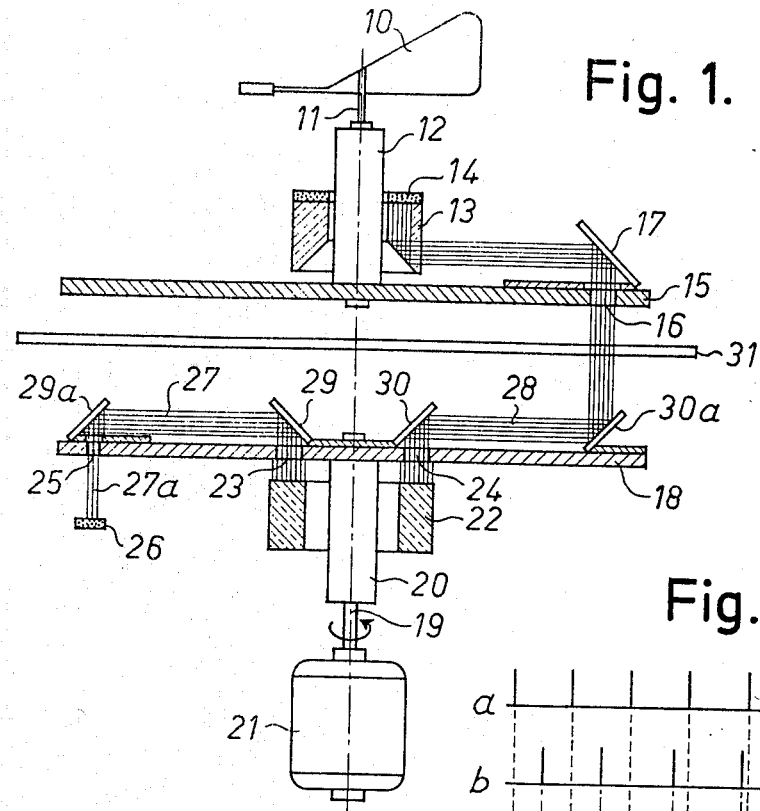

United States Patent [19]

Hansen et al.

[11] 4,334,430
[45] Jun. 15, 1982

[54] DEVICE FOR METERING THE ANGULAR POSITION OF A DIRECTION INDICATOR

[76] Inventors: John A. Hansen, Byagervej 129, DK-3460 Birkerod; Steen Hogh, Fasanvaenget 94, DK-2791 Dragor, both of Denmark

[21] Appl. No.: 209,703
[22] PCT Filed: Jan. 8, 1980
[86] PCT No.: PCT/DK80/00002
  § 371 Date: Sep. 8, 1980
  § 102(e) Date: Sep. 3, 1980
[87] PCT Pub. No.: WO80/01416
  PCT Pub. Date: Jul. 10, 1980

[30] Foreign Application Priority Data

Jan. 8, 1979 [DK] Denmark .................................. 69/79

[51] Int. Cl.³ ........................ G01P 13/02; G01P 5/07
[52] U.S. Cl. .............................................. 73/189
[58] Field of Search ................. 73/189, 188; 33/1 PT, 33/363 K; 250/231 SE

[56] References Cited

U.S. PATENT DOCUMENTS

| | | | |
|---|---|---|---|
| 3,041,599 | 6/1962 | Beaudette | 33/1 PT |
| 3,068,692 | 12/1962 | Morgan | 73/189 |
| 3,282,099 | 11/1966 | Kingman et al. | 73/189 |
| 3,420,101 | 1/1969 | Adams | 73/189 |
| 3,604,810 | 9/1971 | Schuch | 250/231 SE |

FOREIGN PATENT DOCUMENTS

| | | | |
|---|---|---|---|
| 2041284 | 1/1971 | France | 73/189 |
| 7305363 | 12/1974 | Sweden | 73/189 |
| 7305364 | 12/1974 | Sweden | 73/189 |

Primary Examiner—Donald O. Woodiel
Attorney, Agent, or Firm—Dennison, Meserole, Pollack & Scheiner

[57] ABSTRACT

A device for metering the angular position of a direction indicator, such as a wind direction indicator (10) mounted rotatably about an axis. The said device comprises the reference member (18) mounted rotationally about said axis and having driving means (44) for continuously rotating the reference member in a predetermined direction. The reference member (18) includes radiation beam directing means (46, 47) rotating with said reference member (18) so as to direct once each revolution a reference radiation beam and a measuring radiation beam from a radiation source (45) to a first radiation sensing means (26) and to a second radiation beam directing means (48) respectively. The said second directing means (48) is rotatable with the direction indicator (10) and adapted to direct the measuring radiation beam received from said first directing means (47) to second adjacent sensing means (14) generating a measuring signal when exposed to radiation. The said beam directing means may, for example, comprise fiber optical elements or mirrors and apertures. The time delay between generation of each reference signal and the succeeding measuring signal is a function of the angular position of the direction indicator 10, and the reference and measuring signal may be processed in a suitable electrical circuit for obtaining a direct indication of the said angular position.

10 Claims, 5 Drawing Figures

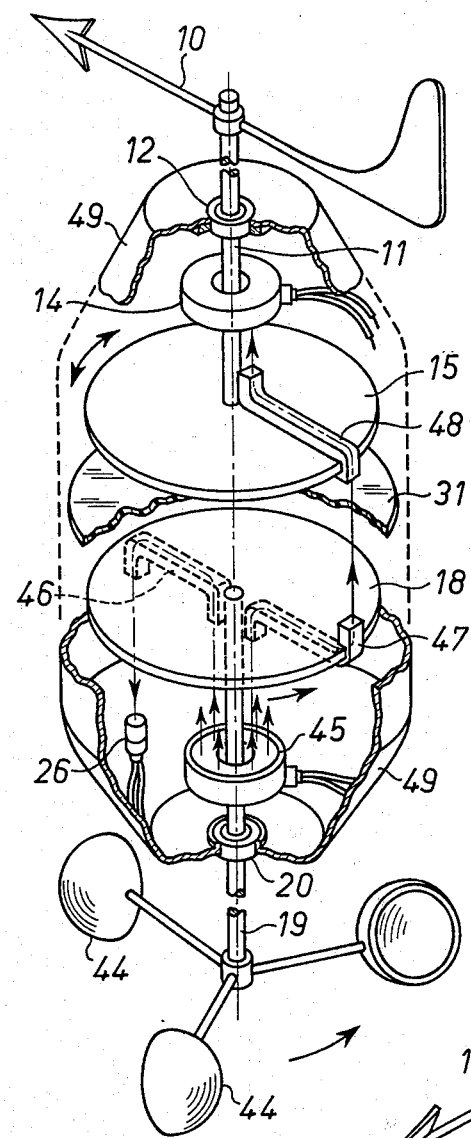
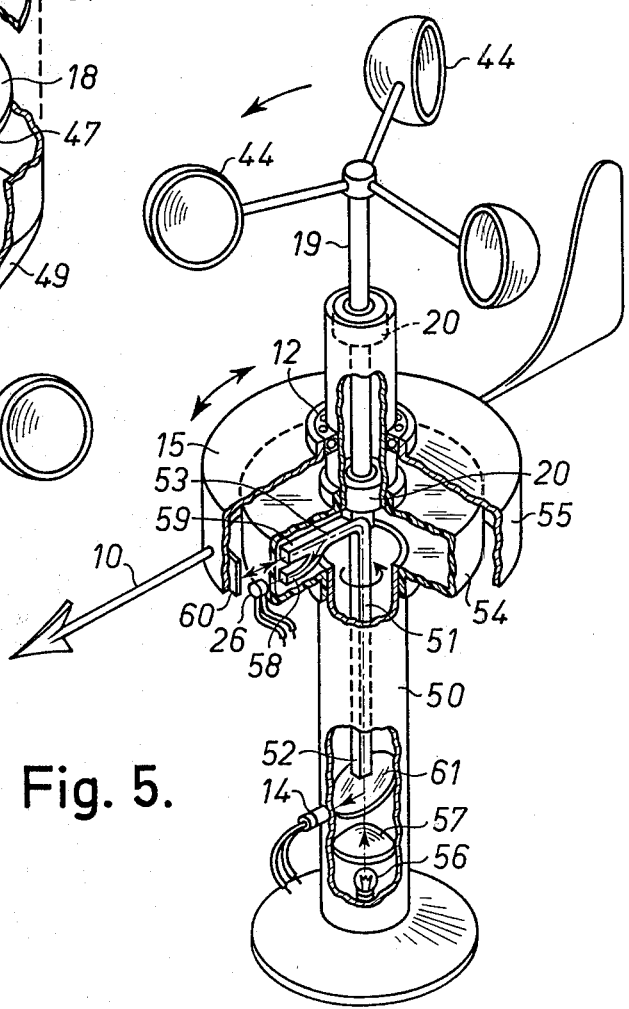
Fig. 4.
Fig. 5.

DEVICE FOR METERING THE ANGULAR POSITION OF A DIRECTION INDICATOR

The present invention relates to a device for metering the angular position of a direction indicator mounted rotatably about an axis. Such indicator may, for example, be used for indicating the direction of a flow of gas or liquid, such as wind or sea currents, or for determing the position of a magnetic needle.

Prior art devices of this general type are disclosed in for example U.S. Pat. Nos. 3,068,692, 3,282,099, and 3,420,101. Thus, U.S. Pat. No. 3,282,099 discloses a wind speed and direction transducing apparatus having wind speed sensing means rotating continuously in a predetermined direction about an axis, and a wind direction indicator mounted rotatably about the same axis. A reference marker is connected to the wind speed sensing means and is rotating together therewith in a magnetic field so as to generate a reference signal or clock pulse once each revolution, and a second marker is connected to the wind direction indicator and movable in said magnetic field. A measuring signal is generated every time the two markers are in the same angular position, and the angular position of the wind direction indicator is determined by comparing the lapsed time between generation of the clock pulse and generation of the measuring signal with the lapsed time between generation of the clock pulse and generation of the next succeeding clock pulse.

The present invention provides a simplified device of the above type in which the use of markers rotating in a magnetic field causing a certain increase in energy consumption, is avoided.

Thus, the present invention provides a device for metering the angular position of a direction indicator mounted rotatably about an axis, said device comprising a reference member mounted rotatably about said axis and having driving means for continuously rotating said reference member in a predetermined direction, means for providing a reference signal at least once each revolution of said reference members, means for providing once each said revolution a measuring signal in a timed relationship with said reference signal, said relationship being a function of said angular position of said direction indicator, and means for determining said angular position on the basis of said reference and measuring signals, said device being characterized in that said reference and measuring signal providing means comprise a radiation source extending about said axis, first radiation beams directing means rotating with said reference member so as to direct once each revolution a reference radiation beam and a measuring radiation beam from said radiation source to a first radiation sensing means and to second radiation beam direction means, respectively, said second directing means bening rotatable with said direction indicator and adapted to direct said measuring radiation beam received from said first directing means to a second radiation sensing means. The said reference member may, for example, be rotated by means of a suitable motor, and the said first radiation sensing means will then generate reference signals or clock pulses with a frequency corresponding to the rotational speed of the reference member. The device according to the invention may be used for indicating the direction of a fluid flow, and in that case the reference member is preferably driven by the said flow.

As an example, the said driving means may constitute part of an anemometer.

As the said second direction means are rotatable with the direction indicator the measuring radiation beam will be transmitted from said first radiation beam directing means to said second radiation beam directing means and further to said second radiation sensing means in a timed relationship to the clock pulses or reference signals so that the angular position of the direction indicator may be determined on the basis of the reference signals or clock pulses generated by the said first radiation sensing means and the measuring signals generated by the said second radiation sensing means. The first and second radiation sensing means may be suitable transducers for converting radiation energy to electrical signals. Such transducers are rather sturdy and maintenance free so that the device according to the invention may be made very reliable in function and may obtain a long useful life. Furthermore, in the device according to the invention where the measuring and reference signals are generated by thin concentrated radiation beams, these signals may be much shorter and more distinct than in the prior devices whereby a greater accuracy of measurement may be obtained. The signals provided by the first and second radiation sensing means may be processed in a suitable electrical circuit, whereby the angular position of the direction indicator may be recorded in any suitable manner.

The said first radiation beam directing means may define two separate radiation paths, the said reference pf said measuring radiation beams, respectively. In that case these paths may be defined by fiber optical elements and/or apertures and radiation reflecting means or mirrors for directing radiation from said radiation source through said apertures. Also the second directing means may comprise a fiber optical element and/or an aperture defined by said direction indicator and radiation reflecting means for directing radiation passed through said aperture to said second light sensing means.

However, in the preferred embodiment the said first radiation beam directing means comprise a fiber optical element having a first and adjacent to said radiation source, and a second and registering in a first rotational position of said reference member with said first radiation sensing means and in a second variable rotational position with a radiation reflecting surface, such as a mirror surface, on said direction indicator, said reflecting surface being substantially at right angles to the axial direction of the second end of the fiber optical element, third radiation beam directing means being provided at said first end of the fiber optical element for transmitting radiation having passed from said reflecting surface towards said light source through said fiber optical elements to said second light sensing means, and these third radiation directing means may comprise a semi-transparent mirror arranged between said light source and said first end of the fiber optical element. The same fiber optical element may then be used for transmitting radiation from said radiation source in one direction to said first radiation sensing means, and from said radiation reflecting surface back through the fiber optical elements in the opposite direction to said second radiation sensing means via said third radiation beam direction means or semi-transparent mirror.

It should be understood that the radiation used in the device according to the invention could be visible light or any other type of radiation such as infrared and ultraviolet radiation.

Figure 3:
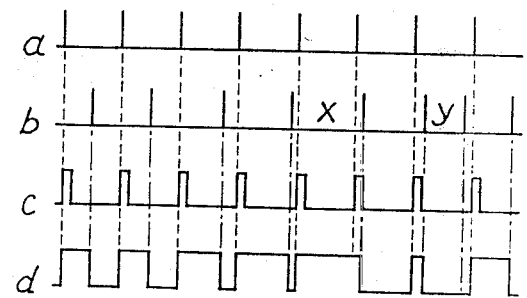
Figure 2:
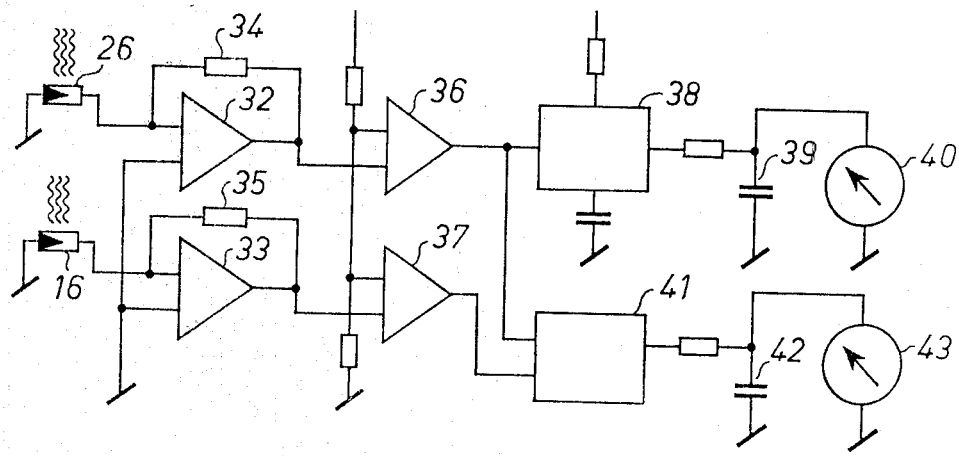

The invention will now be further described with reference to the drawings, wherein FIG. 1 is a diagrammatic and partially sectional view of a first embodiment of the device according to the invention, FIG. 2 is a block diagram showing an embodiment of an electrical circuit which may be used in connection with the device according to the invention, FIG. 3 is a diagram illustrating the timed relationship between reference and measuring signals, FIG. 4 is a perspective view of a second embodiment of the device according to the invention with certain parts cut away, and FIG. 5 is a perspective view of a third embodiment of the device according to the invention with certain parts cut away.

The device shown in FIG. 1 comprises a wind direction indicator 10 mounted at the upper end of a vertical shaft 11 which is rotatable mounted in a bearing 12. The bearing 12 is surrounded by an annular cylinder-shaped light conductor or fiber optical element 13, which is stationary, and a light sensor or transducer such as a photoelectric cell for converting light or radiation energy received into an electrical signal is mounted at the upper end surface of the light conductor 13. A disc member 15 fastened to the lower end of the shaft 11 has an aperture 16 formed therein. A light reflecting member or a mirror 17 is mounted on the upper surface of the disc member 15 above the aperture 16 and defines an acute angle with the upper surface of the disc member.

A second disc member 18 is mounted at the upper end of a second shaft 19 which is coaxial with the shaft 11 and rotatably mounted in a second bearing 20. The shaft 19 may be rotated by an electric motor 21 or other suitable driving means. A second annular cylindrical conductor or fiber optical element 22 is positioned stationary about the bearing 20 and coaxially therewith. Two diametrically oppositely arranged apertures 23 and 24 are formed in the disc member 18 immediately above the upper end surface of the annular light conductor 22, and a third smaller aperture 25 is formed adjacent the peripheral portion of the disc member 18. A light sensor or transducer 26 which is preferably of the same type as the transducer 14 is arranged below the second disc member 18 in such a position that the aperture 25 may register with the transducer 26 in one angular position of the disc member 18. The annular light conductor 22 may transmit an annular light beam from a light source (not shown) arranged at the lower end of the light conductor, to the lower surface of the disc member 18. The apertures 23 and 24 allow two separate light beams 27 and 28 to pass through the disc member 18 and to be reflected by light reflecting members or mirrors 29 and 30 which rotate together with the disc member 18 and define acute angles with the upper surface thereof. The reflected light beams 27 and 28 extend substantially parallel with the upper surface of the disc member 18 and hit further reflecting members or mirrors 29a and 30a, respectively, which are also mounted on the upper surface of the disc member 18 and rotate together with said disc member. As illustrated in FIG. 1, the light beam 27 will be reflected by the mirror 29a so that a thin, distinct light beam 27a is continuously passed downwardly through the aperture 25. The light beam 28 is reflected upwardly by the mirror 30a so that it may pass through the aperture 16 when the disc members 15 and 18 are in such mutually angular positions that the mirror 32 is positioned immediately below the aperture 16. A transparent, stationary screen 31 is preferably positioned between the disc members 15 and 18 so as to prevent the continuously rotating disc 18 from influencing the angular position of the disc member 15 or the wind direction indicator 10.

In operation, the electric motor 21 is rotating the disc member 18 and the mirrors 29-32 mounted thereon at a substantially constant rotational speed. The light beam 27a having passed the aperture 25 will then hit the light sensor 26 once each revolution whereby the light sensor generates a reference signal. If the angular positions of the direction indicator 10 and the disc member 15 are such that the mirror 32 is registering with the aperture 16 in the disc member 15 at the same moment as when the light beam 27a hits the light sensor 26 as shown in FIG. 1, the light sensor 14 will generate a measuring signal at the same moment as when the light sensor 26 generates a reference signal. This angular position of the direction indicator may be considered a reference position and may, for example, be north. If the direction indicator 10 takes up any other angular position the measuring signal will be generated with a certain time delay after generation of the corresponding reference signal, and the angular position of the direction indicator 10 in relation to the said reference position may be estimated on the basis of this time delay.

As explained below, the motor 21 may be replaced by other driving means, for example an anemometer, and the frequency of the reference signals may in that case be used for determining the velocity of the wind or another flowing medium.

The reference and measuring signals generated by the photoelectric cells or photo diodes 14 and 26 may be processed in the electrical circuit shown in FIG. 2. The reference and measuring signals are current pulses, and the reference signals are converted into voltage pulses by means of an amplifier 32 and a resistor 34, while the measuring signals are converted into voltage pulses by means of an amplifier 33 and a resistor 35. These reference voltage pulses and measuring voltage pulses are illustrated with respect to time in FIG. 3a and 3b, respectively. The reference and measuring voltage pulses are supplied to a comparator 36 and 37, respectively. The output signal from the comparator 36, to which the reference signal is supplied, is used for triggering a one-shot multivibrator 38 providing uniform pulses shown in FIG. 3c. If the driving motor 21 has been replaced by an anemometer, the frequency of the pulses may be varying. The mean value of the pulse train may, however, be determined by an RC-circuit 34 having its output connected to a meter or wind velocity indicator 40 which may directly indicate the wind velocity. A set-reset flipflop has its set-input connected to the comparator 36 and its reset-input connected to the comparator 37. Consequently, the output signal generated by the flipflop 49 and illustrated in FIG. 3d has a mean value being proportional with the angular deviation of the direction indicator 10 from the above defined reference position or direction. This value may be determined by an RC-circuit 42 having its output connected to a meter 43 which may directly indicate the wind direction, i.e. the angular position of the direction indicator 10. The meters 40 and 43 may, of course, be replaced by any other suitable registration means.

The wind direction may change so rapidly that either no measuring signal is generated between two consequtive reference signals as illustrated at x in FIG. 3, or the two measuring signals are generated between two consecutive reference signals as shown at y in FIG. 3. This is, of course, a source of error. The visible effect of such error may, however, be suppressed by suitable choice of the time constant of the RC-circuit 42.

The presently preferred embodiments shown in FIGS. 4 and 5 will now be described, and parts shown in FIGS. 4 and 5 and corresponding to parts in FIG. 1 are provided with like reference numbers.

In the embodiment shown in FIG. 4 the motor 21 has been replaced by wind cups 44 forming part of an anemometer. An annular light source 45 is arranged around the shaft 19 below the disc member 18. In FIG. 4 the apertures 24 and 25 and the mirrors 29 and 29a have been replaced by a light conducting fiber optical element 46, and the aperture 24 and the mirrors 30 and 30a have been replaced by a second light conducting fiber optical element 47. Both fiber optical elements 46 and 47 are mounted on the disc member 18 and are rotating together therewith. Similarly, in the embodiment shown in FIG. 4 the aperture 16, the mirror 17, and the light conductor 13 in FIG. 1 have been replaced by a single fiber optical element 48 mounted on the disc member 15. As indicated in FIG. 4, the parts of the device arranged between the wind direction indicator 10 and the wind cups 44 may be surrounded by a housing 49.

The reference signals generated by the light sensor or photo diode 26 and the measuring signals generated by the light sensor 14 may be processed in an electric circuit as that described above with reference to FIG. 2. The meter 43 may then directly indicate the wind velocity as measured by the anemometer.

FIG. 5 shows a preferred embodiment with a design somewhat different from that of FIGS. 1 and 4. The device shown in FIG. 5 comprises a stationary housing 50 in which the shaft 19 of the wind cups 44 are rotatably mounted in bearings 20. A fiber optical element 51 is mounted at the lower end of the shaft 19 so as to be rotatable therewith. The element 51 comprises axial portion 52 extending along the rotational axis of the shaft 19, and a radially extending portion 53 which may rotate in a radially enlarged portion 54 of the housing 50. The wind direction indicator 10 is mounted on a depending skirt 55 of the disc member 15 which is rotatably mounted in relation to the housing 50 by means of a bearing 12.

A light source 56 is mounted at the lower end of the housing 50, and light emitted by the light source is focused on the lower end of the axial portion 52 of the element 51 by means of a convex lense 57. The free end of the radial portion 53 of the fiber optical element 51 is bifurcated and has a lower arm 58 which may be aligned with the light sensor 26 in one angular position, and an upper arm 59 which may be aligned with a reflecting surface or mirror 60 mounted on the inner side of the skirt 55 in alignment with the indicator 10.

When the shaft 19 and the fiber optical element 51 are rotated by the wind cups 44 the light sensor 26 will generate a reference signal once each revolution, namely each time the lower arm 58 of the fiber optical element 51 is in a position opposite to the light sensor 26. Each time when the upper arm 59 is opposite to the mirror 60 the light beam transmitted to the upper arm 59 will be reflected by the mirror 60 and returned through the fiber optical element. A semi-transparent mirror 61 is arranged between the lense 57 and the lower free end of the axial portion of the fiber optical element in a slanting position. The mirror 61 allows a light beam hitting the bottom side of the mirror to pass therethrough while a light beam hitting the upper side of the mirror will be reflected thereby. Consequently, a light beam reflected by the mirror 60 and returned through the fiber optical element 51 is passed to the light sensor 14 via the semi-transparent mirror 61. In this manner the light sensor 14 will generate a measuring signal every time the upper arm 59 of the fiber optical element 51 passes the mirror 60.

The measuring and reference signals generated by the sensors 14 and 26, respectively, may be processed in an electric circuit as that shown in FIG. 2, or in any other suitable electrical circuit.

It should be understood that various changes of the embodiments shown on the drawings may be made within the scope of the present invention. Thus, the wind cups 44 of the embodiment shown in FIGS. 4 and 5 may be replaced by any other suitable type of driving means, and similarly, the motor 21 shown in FIG. 1 may be replaced by wind cups.

We claim:

1. A device for metering the angular position of a direction indicator (10) mounted rotatably about an axis, said device comprising a reference member (18) mounted rotationally about said axis and having driving means (21,44) for continuously rotating said reference member in a predetermined direction, means (26) for providing a reference signal at least once each revolution of said reference member, means (14) for providing once each said revolution a measuring signal in a timed relationship to said reference signal, said relationship being a function of said angular position of said direction indicator, and means (40) for determining said angular position on the basis of said reference and measuring signals, characterized in that said reference and measuring signal providing means comprise a radiation source (45; 56) extending about said axis, first radiation beam directing means (23-25, 29, 29a, 30, 30a; 46, 47; 51) rotating with said reference member (18) so as to direct once each revolution a reference radiation beam and a measuring radiation beam from said radiation source to a first radiation sensing means (26) and to second radiation beam directing means (13, 16, 17; 48; 60), respectively, said second directing means being rotatable with said direction indicator (10) and adapted to direct said measuring radiation beam received from said first directing means to a second radiation sensing means (14).

2. A device according to claim 1, characterized in that said first radiation beam directing means defines two separate radiation paths for said reference and said measuring radiation beams, respectively, (FIGS. 1 and 4).

3. A device according to claim 2, characterized in that said radiation paths are defined by apertures (23-25) and radiation reflecting means (29,29a, 30, 30a) for directing radiation from said radiation source through said apertures.

4. A device according to claim 2 or 3, characterized in that said second directing means comprise an aperture (16) defined by said direction indicator (10,15) and radiation reflecting means (17) for directing radiation passed through said aperture to said second light sensing means (14).

5. A method according to claim 2, characterized in that at least once of said light paths is defined by a fiber optical element (46, 47).

6. A device according to any of the claims 2, 3, 5, characterized in that said second directing means comprise a fiber optical element (48) for receiving once each revolution a radiation pulse from one of said light paths and for directing said radiation pulse to said second sensing means (14).

7. A device according to claim 1, characterized in that said first radiation beam directing means comprise a fiber optical element (51) having a first end adjacent to said radiation source (56), and a second end registering in a first rotational position of said reference member with said first radiation sensing means (26) and in a second variable rotational position with a radiation reflecting surface (60) on said direction indicator (10, 15), said reflecting surface being substantially at right angles to the axial direction of said second end of the fiber optical element, third radiation beam directing means (61) being provided at said first end of the fiber optical element for transmitting radition having passed from said reflecting surfac (60) towards said light source (56) through said fiber optical element (51) to said second radiation sensing means (14).

8. A device according to claim 7, wherein said third radiation directing means comprises a semi-transparent mirror (61) arranged between said light source (56) and said first end of the fiber optical element (51).

9. A device according to any of the claims 1, 2, 3, 5, 7, 8 characterized in that said reference member (18) and said driving means (44) constitute part of an anemometer, and that said direction indicator is a wind direction indicator (10).

10. A device according to any of the claims 1, 2, 3, 5, 7, 8 characterized in that said radiation sensors are photo diodes (14, 26).

* * * * *